(12) United States Patent
Gaylo et al.

(10) Patent No.: US 6,336,480 B2
(45) Date of Patent: *Jan. 8, 2002

(54) APPARATUS AND METHOD FOR DISPENSING OF POWDERS

(75) Inventors: Christopher M. Gaylo, Princeton Junction; Ireneusz J. Imiolek, Warren; Jeffrey A. Fedor, Hopewell, all of NJ (US)

(73) Assignee: Therics, Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/829,533

(22) Filed: Apr. 9, 2001

Related U.S. Application Data (63) Continuation of application No. 09/343,239, filed on Jun. 30, 1999, now Pat. No. 6,213,168, which is a continuation-in-part of application No. 09/052,179, filed on Mar. 31, 1998, now Pat. No. 5,934,343.
(60) Provisional application No. 60/042,195, filed on Mar. 31, 1997.

(51) Int. Cl.⁷ .................................................. B65B 1/04
(52) U.S. Cl. ..................... 141/12; 141/73; 425/218; 425/253; 425/447; 264/308
(58) Field of Search ..................... 141/12, 73, 74, 141/80, 280, 124, 256; 264/308; 425/218, 253, 447; 222/413

(56) References Cited

U.S. PATENT DOCUMENTS

| | | | |
|---|---|---|---|
| 2,000,958 A | 5/1935 | Jarrier | 249/60 |
| 2,569,039 A | 9/1951 | Berthelot | 198/64 |
| 3,474,937 A | 10/1969 | Frey | 222/227 |
| 4,131,648 A | 12/1978 | Choi et al. | 424/22 |
| 4,802,836 A | 2/1989 | Whissell | 425/253 |
| 5,204,055 A | 4/1993 | Sachs et al. | 419/2 |
| 5,340,656 A | 8/1994 | Sachs et al. | 428/546 |
| 5,387,380 A | 2/1995 | Cima et al. | 264/69 |
| 5,490,882 A | 2/1996 | Sachs et al. | 134/1 |
| 5,490,962 A | 2/1996 | Cima et al. | 264/22 |
| 5,518,680 A | 5/1996 | Cima et al. | 264/401 |
| 5,647,931 A | 7/1997 | Retallick et al. | 156/73.6 |
| 5,934,343 A | 8/1999 | Gaylo et al. | 141/12 |

OTHER PUBLICATIONS

Sachs, Emanuel et al., "CAD–Casting: Direct Fabrication of Ceramic Shells and Cores by Three Dimensional Printing," *Manufacturing Review*, American Society of Mechanical Engineers, 5(2): 117–126, 1992.

*Primary Examiner*—Steven O. Douglas
(74) *Attorney, Agent, or Firm*—Seed Intellectual Property Law Group PLLC (57) ABSTRACT

A method and apparatus for dispensing and distributing a powder is disclosed that uses a rotary dispenser to dispense the powder by gravity onto a movable platen, the platen being movable to a position adjacent to a build bed where the powder can be distributed across the build bed using a spreader. The method and apparatus are also suited to dispensing of a plurality of powders used in build beds for solid free-form fabrication and three-dimensional printing. It is preferred that a powder contacting surface of the apparatus be coated with a coating selected from the group consisting of: an anodized finish, a hardcoat anodized finish, siloxane, baked enamel, electroplated enamel, electroless nickel, coated elastomer, laminated elastomer, dipped latex, sprayed latex, polyvinyl chloride, nylon, polytetrafluoroethylene, polyurethane, an epoxy resin, or a polyester.

14 Claims, 6 Drawing Sheets

APPARATUS AND METHOD FOR DISPENSING OF POWDERS

This application is a Cont. of Ser. No. 09/343,239, filed Jun. 30, 1999, now U.S. Pat. No. 6,213,168, which is a CIP of Ser. No. 09/052,179, filed Mar. 31, 1998, now U.S. Pat. No. 5,934,343, issued Jun. 10, 1999, which claims benefit of Ser. No. 60/042,195, filed Mar. 31, 1997.

FIELD OF THE INVENTION

The present invention relates to methods and systems for measuring, dispensing and spreading of powders. In particular, the invention relates to a method for measuring and dispensing a powder for use in a three dimensional printing or solid freeform fabrication system.

BACKGROUND OF THE INVENTION

The construction of articles of manufacture using solid free-form fabrication (SFF) methods has been disclosed in U.S. Pat. No. 5,490,962, and in U.S. Pat. No. 5,387,380 on three-dimensional printing (3DP). These SFF and 3DP methods have the ability to construct a wide range of objects using construction materials in powdered form. A limitation in building practical devices useful for implementing SFF and 3DP methods is a powder handling system that can be used to dispense selected amounts of a variety of powders under computer or manual control, with a minimum of human intervention and with a minimum of cross-contamination between powders. The present invention is a system designed to dispense powders while satisfying these needs.

There are many arts which require the measurement of quantities of a powder and the dispensing of such powder. At times a measured powder sample is needed for blending with another powder sample. Technological arts such as pharmaceutical manufacturing, powder coating, confection manufacturing, powder metallurgy, cosmetics, spices, and flavorings are some examples of areas of technology which have a need for such powder handling methods. There is an especially important need for efficient powder dispensing and distribution in the use of SFF methods. SFF and 3DP use one or more powders dispensed from a reservoir into a container typically called a build bed to fabricate articles of manufacture. In these methods of fabrication a portion of at least one powder is transferred from the reservoir to the build bed to form a layer of powder. Various techniques are used to form a solid from a portion of the layer of powder. In the case of 3DP a binder is printed onto a layer of powder in a build bed to convert a portion of the layer from a powder into a solid. Successive portions of the same or a different powder are then dispensed and spread over an existing layer in the build bed and subjected to additional printing on selected portions of each successive layer of powder.

It has been disclosed in U.S. Pat. No. 5,204,055 that in a 3DP process a powder being applied in a layer on a build bed can be distributed from a dispensing head passing over a build bed. In U.S. Pat. No. 5,387,380 is disclosed the use of a sieve drum for dispensing powder over a build bed. Both of these disclosed systems and methods of operation suffer from problems. The thickness of a layer of powder deposited on a build bed is known in the art to be an important parameter in how well 3DP or SFF works in manufacturing an article. The thickness of a layer depends on both any method used for compacting the powder, and the amount of powder dispensed onto the build bed. The dispensing head and sieve drum disclosed in these two patents require a complicated multicomponent apparatus adapted for motion over a build bed for their operation. If only one dispensing head or sieve drum is used in a given 3DP or SFF apparatus, then the dispensing head or sieve drum used would require cleaning during a changeover to a second powder if multiple powders were used in the 3DP or SFF fabrication of an article. The complexity of the dispensing head and sieve drum and the risk of cross-contamination of powders in a multipowder 3DP or SFF fabrication method are serious disadvantages in the disclosed powder dispensing systems.

A method and an apparatus for use in 3DP were disclosed in U.S. Pat. No. 5,647,931. A method for dispensing powders, that can be used in 3DP processes, was disclosed in that patent. That method is described as having a selected powder metered from a reservoir by use of a rotating notched drum feeding device. The powder so metered is allowed to fall by gravity into a movable container. This movable container is adapted for motion above a build bed, and for distributing the powder onto the build bed. This apparatus and method both have the disadvantage of increased complexity. The apparatus disclosed uses a movable container fitted with a means for vibrating the container to distribute powder over a build bed. The movable container would need to be cleaned from time to time to ensure that powder is not retained in its interior. The movable container has a large surface area contacting the powder, and which would require cleaning. The present invention provides an apparatus and a method for measuring and distribution of powders for SFF use, that are simpler and that require less complex equipment than that disclosed in the U.S. Pat. No. 5,647,931.

SUMMARY OF THE INVENTION

A method for dispensing a powder is disclosed here which uses a rotating cylindrical dispenser to meter measured portions of a powder from a dispensing hopper. A powder dispensed from said hopper is dropped by force of gravity to a platen, said platen being movable horizontally from a first position under said hopper to a second position along a build bed container for containing powder to be consolidated into fabricated articles of manufacture. Any of the SFF methods of fabrication could be used with the invention such as but not limited to 3DP, selective laser sintering, or stereolithography. The method of the present invention discloses distribution of the powder from the platen across the build bed to distribute the powder as a layer over the upper surface of the build bed.

The rotating cylindrical dispenser may comprise a rotating cylinder having an elongate recess, and adapted for rotation from a position allowing powder flow from the hopper into the recess, to a position allowing powder flow from the recess onto the platen. This rotating cylinder is referred to as a rotating spoon. The rotating cylindrical dispenser may also comprise a rotating screw adapted to convey powder from the interior of the hopper to the exterior of the hopper, from where the powder can fall to a platen.

The system repeats the process a selected number of times necessary to deposit a selected number of layers of powder on the build bed. The number of layers is selected by the operator of the system depending on the size of the articles to be fabricated, the nature of the powder or powders used in the build bed, and the amount of detail to be incorporated into the fabricated articles.

By use of an elongate platen in the method of the present invention, multiple powders can be used in fabricating articles using SFF and 3DP. According to the teachings of the invention an elongate platen is mounted under a plurality of hoppers for containing powder. The length of the elongate platen is determined by the length of the hoppers and the distance between the hoppers, a suitable platen extending under each powder hopper being used in the method.

It is an object of the present invention to provide a method for dispensing a powder for use in SFF and especially 3DP which can be automated.

It is an object of the present invention to provide a method for dispensing multiple powders for use in SFF and especially 3DP which can be automated.

It is an object of the present invention to provide a method for dispensing multiple powders for use in SFF and especially 3DP which minimizes the number of mechanical parts necessary in an apparatus used for SFF and 3DP.

It is an object of the present invention to provide a method for dispensing multiple powders for use in SFF and especially 3DP which allows for refilling a powder dispenser while a SFF and 3DP apparatus is in operation.

It is a further object of the present invention to provide a method for dispensing multiple powders for use in SFF and especially 3DP which minimizes cross-contamination between the powders used.

A method for dispensing multiple powders is disclosed herein which can be automated and which also provides for the minimization of potential cross-contamination between the powders used. A similar method is also disclosed which can be used with only one powder. An apparatus is disclosed which enables the use of the methods disclosed. The methods and apparatus also provide for the distribution of a dispensed powder over a build bed.

The methods of the present invention consist of at least one powder dispensing hopper, a sliding platen to horizontally transport dispensed powder and a powered roller to deliver dispensed powder from the platen to a build bed.

Parts of the powder dispensing apparatus may be made of nylon polytetrafluoroethylene or other suitable materials of construction. The apparatus according to the invention is preferably made of a durable metal such as stainless steel, aluminum or an aluminum alloy. It is especially preferred that the apparatus according to the invention be made of aluminum alloy.

It has also been discovered that the invention is used to best advantage when at least one powder contacting surface of the apparatus is surface treated or is covered with a coating. Examples of coatings that are suitable for use in practicing the invention include: metal laminates consisting of metals other than nickel, an anodized finish, a hardcoat anodized finish, siloxane, baked enamel, electroplated enamel, electroless nickel, coated elastomer, laminated elastomer, dipped latex, sprayed latex, polyvinyl chloride, nylon, polytetrafluoroethylene, polyurethane, an epoxy resin, or a polyester. By latex is contemplated the use of a resin such as styrene-butadiene, polyvinyl acetate, or acrylic resins. It is preferred that a coating for use in practice of the present invention be a coating approved by the U.S. Food and Drug Administration for use in pharmaceutical manufacturing.

Advantages we have found achieved with the apparatus and method of the present invention include: providing inertness to prevent contamination of active drugs or excipients used in the SFF or 3DP processes, providing "grip" for the base layer in the processes, compliance with FDA regulations or USDA regulations, providing resistance to corrosion when certain active drug substances are present as a powder to extend the useful life of the machine components of the apparatus. Easier release of a finished article from a build bed after completion of a solid free-form fabrication process used to make the article, is also achieved by coating powder contacting parts of the apparatus. By the use of a properly selected coating, a less expensive metal may be used to advantage in the apparatus of the invention. For example, by using an anodized finish on an aluminum component of the apparatus, aluminum may be used for that component instead of stainless steel.

By "grip" here is meant the adherence of a powder layer to a surface. In using a powder process involving SFF or 3DP, a powder must be spread over a build bed. It has been found that the first few layers of the spread powder must have a certain amount of adherence to the build bed surface, usually a piston, to allow subsequent layers of powder to be readily spread over these first layers, without disturbing those first layers. A coating of a material such as a latex over the surface of the build bed or piston has now been found to provide a desirable amount of such grip.

We have now also found that combinations of coatings may be used on surfaces of the inventive apparatus to great advantage. A hardcoat anodized finish may be combined with a subsequent polytetrafluoroethylene coating to render an aluminum surface to be especially well suited for use in practicing the method of the invention. Surfaces of a powder dispensing apparatus in accord with the teachings of the present invention, that can advantageously be coated include: the hopper interior, the powder transport screw, a spreader used for conveying powder from a platen to a build bed, a rotating cylinder interior recess or rotating spoon, a piston supporting a build bed and the transport platen. The spreader is understood to be either in the form of a scraper, a doctor blade, or a roller. If a roller is used, the roller may be powered.

Combinations of different surface coatings on different powder contacting surfaces used in the same inventive apparatus are also contemplated as being encompassed by the invention. A coating according to the present invention such as a polyvinyl chloride may be desirable for use on a build bed piston to provide "grip" of first powder layers, and a hardcoat anodized finish further comprising polytetrafluoroethylene would be desirable on the platen or rotary powder dispenser used in the apparatus.

BRIEF DESCRIPTION OF THE DRAWINGS

The invention can be described in more detail with the help of the accompanying drawings wherein.

DETAILED DESCRIPTION

The invention may be understood by consideration of the following description, in conjunction with the drawings provided herewith. The same reference numbers are used to indicate corresponding parts in the views.

Figure 1:
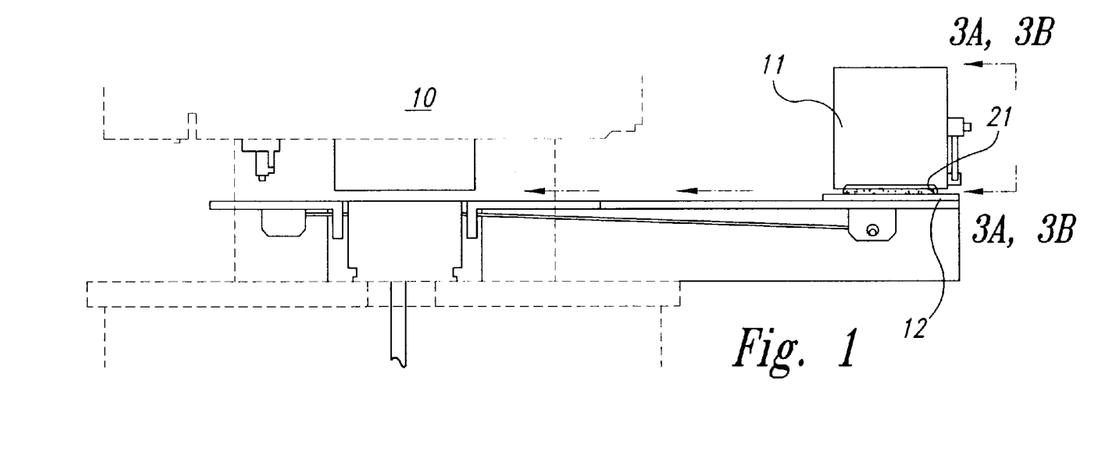
FIG. 1 illustrates a side view of an embodiment of the invention.

In FIG. 1 is shown a side view of an embodiment 10 of the invention. A hopper 11 is shown with a platen 12 below said hopper.

Figure 3A:
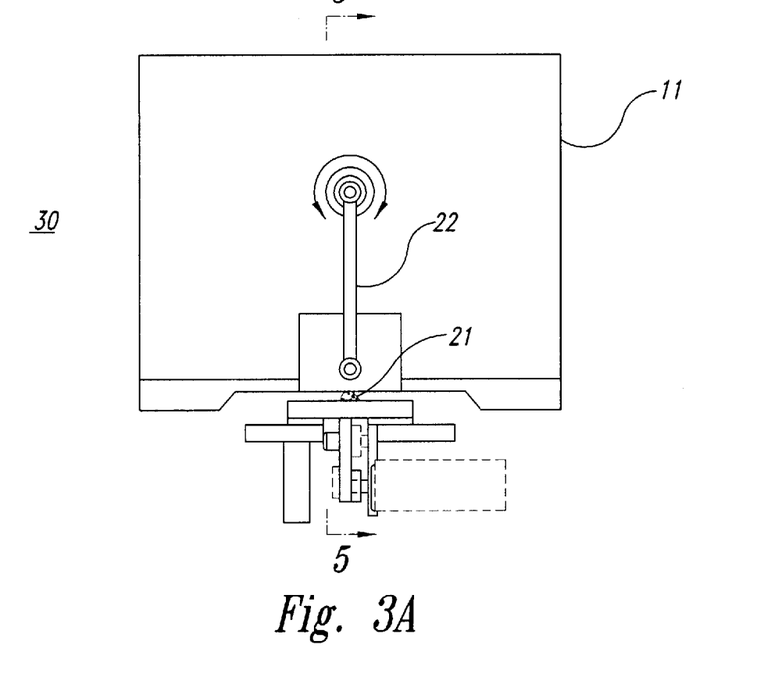
FIG. 3A shows an end view of a hopper in accordance with the invention.
Figure 3B:
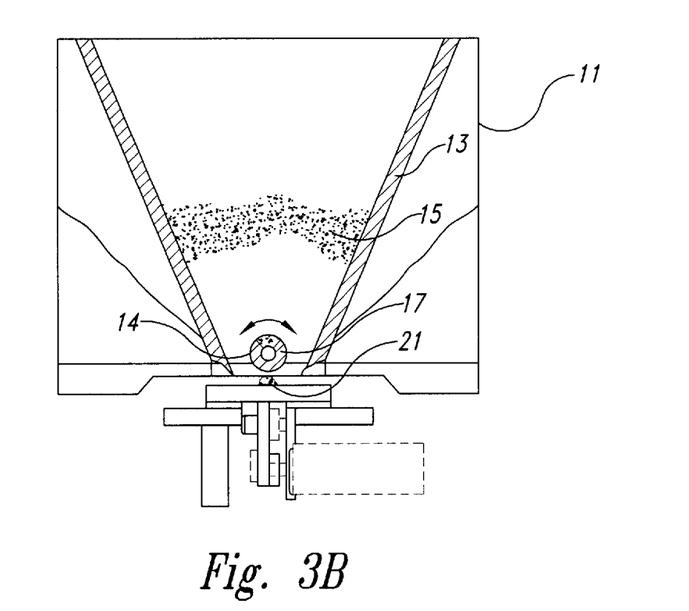
FIG. 3B shows a sectional view of a hopper in accordance with the invention.
Figure 5:
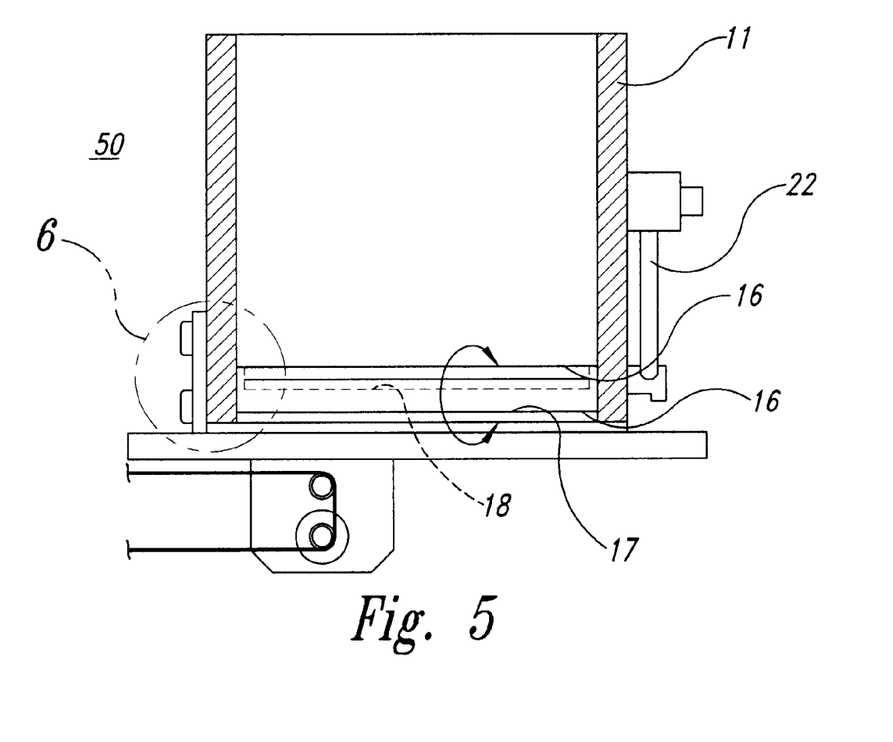
FIG. 5 shows a side sectional view of a powder hopper in accordance with the invention.
Figure 6:
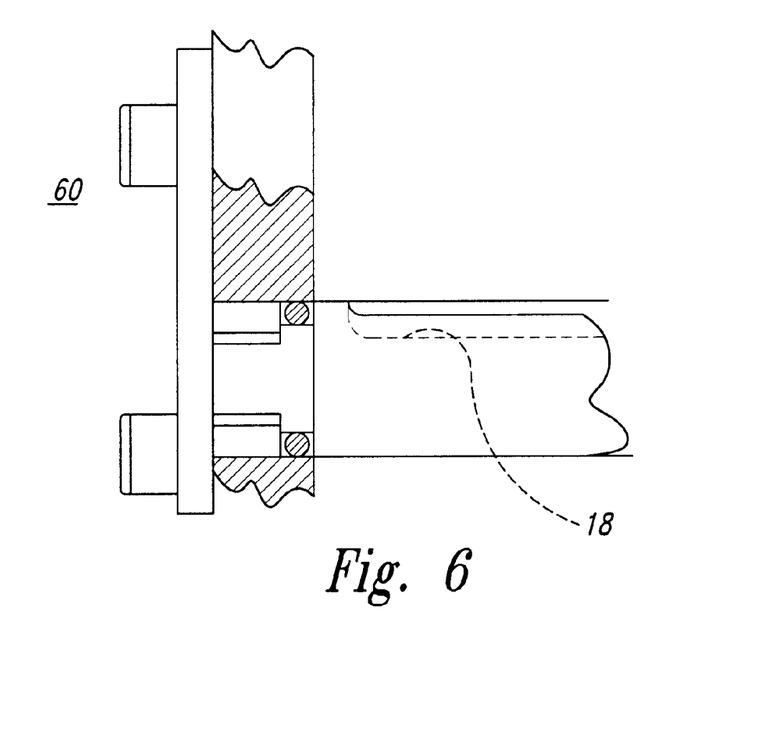
FIG. 6 shows a detail of the powder hopper of FIG. 5.

A powder dispensing hopper according to the teachings of the invention comprises a container volume with sloping walls 13, which can also include internal baffles or channels to assist in the directing of the powder to the bottom of the hopper. Such a hopper 11 is shown in section in FIG. 3B. At the bottom of the hopper is located a rotary dispenser 14 for dispensing a powder 15 from the hopper. The rotary dispenser 14 comprises a cylindrical sleeve 16 in FIG. 5 having a long axis and two opposed side openings parallel to the long axis, having a first opposed side open to an interior of said hopper and having a second opposed side open to an exterior of said hopper, said rotary dispenser further comprising a cylinder 17 sized and shaped to be closely received within said cylindrical sleeve and rotatably mounted within said cylindrical sleeve, said cylinder further having an elongate recess 18 disposed at the surface of said cylinder. With this rotary dispenser, when the recess at the surface of the cylinder is rotated within the cylindrical sleeve to be open to the interior of the hopper, powder contained in the hopper feeds or flows by gravity into said recess. Rotation of the cylinder within the cylindrical sleeve to a position open to the outside of the hopper allows powder within the recess to flow by gravity from the cylinder to a platen 12 in a first position below the hopper. A portion 21 of powder is deposited on the platen as shown in FIG. 5. Rotation of the cylinder to its original orientation in the cylindrical sleeve allows the recess to refill with the powder.

There is an advantage to using a rotary dispenser as disclosed herein. One skilled in the art of SFF and 3DP can determine the size of recess to use in a rotating cylinder of the invention. Adjustment of the size of the recess allows one skilled in the art to determine the amount of a powder to be dispensed on a platen for a given application. By controlling the size of the recess used, the amount of dispensed powder used to form a layer of powder on a build bed is determined. From the area of a build bed and the desired thickness of powder to be distributed over the area, one skilled in the art can calculate the volume of powder to be dispensed onto the platen and distributed over the build bed. For a rotating cylinder made from a hard material such as a metal, the size of a recess to be machined along the length of the cylinder can be calculated.

Figure 8:
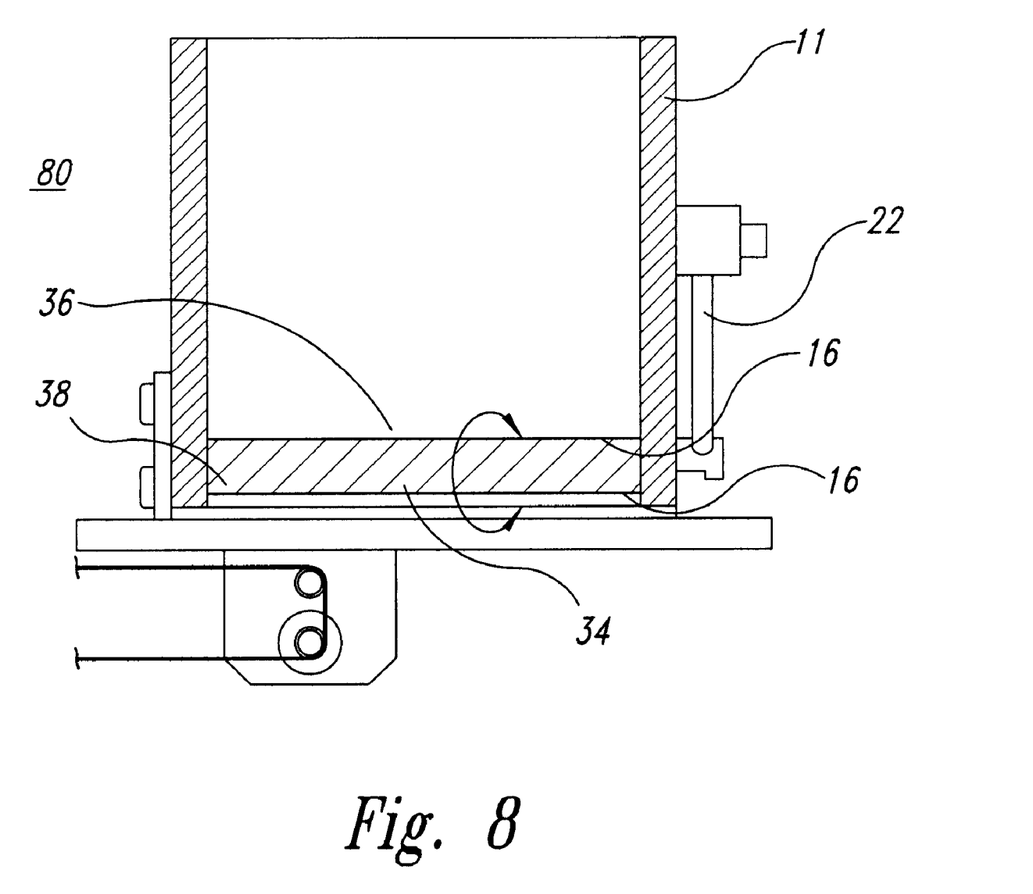
FIG. 8 shows a side sectional view, taken in the same plain as FIG. 5, of a powder hopper in accordance with an alternative embodiment of the invention, having a rotating screw mechanism.

An alternative embodiment of the apparatus of the invention uses a rotating screw as the mechanism to convey a powder from the powder holding hopper to a powder transporting platen disposed below the hopper. Quantitative metering of the amount of powder to be dispensed from the hopper onto the platen may be selected by calculating the amount of powder that is conveyed from the hopper by a given amount of rotation of the screw being used. In this embodiment, the rotating screw is mounted at the bottom of the hopper, in a generally horizontal orientation. FIG. 8 illustrates such an alternative embodiment 80. A rotating screw 34, also called an auger, is mounted for rotation within a cylindrical sleeve 16. The sleeve has at least one inlet opening 36 extending from the hopper interior to the screw 34. An outlet opening 38 is provided in the cylindrical sleeve for conveying powder from the screw to the hopper exterior, where the powder can then fall by gravity onto a platen. The outlet opening may be disposed below the hopper or at an end of the rotating screw as shown.

If a rotating screw is used to dispense a powder from the hopper, it is to be understood that the platen would index as the powder is dispensed from the end of the screw.

The operation of the methods of the present invention can be readily automated. The rotation of the rotary dispenser can be controlled by a motor. A motor under computer control can be used with a timing belt to rotate a pulley, sprocket or crank 22 coupled to an end of the rotating cylinder in the rotary dispenser according to the invention, for example. Alternatively, a gear linkage (not shown) or a stepper motor (not shown) can be used to effect rotation of the rotary dispenser.

Figure 2:
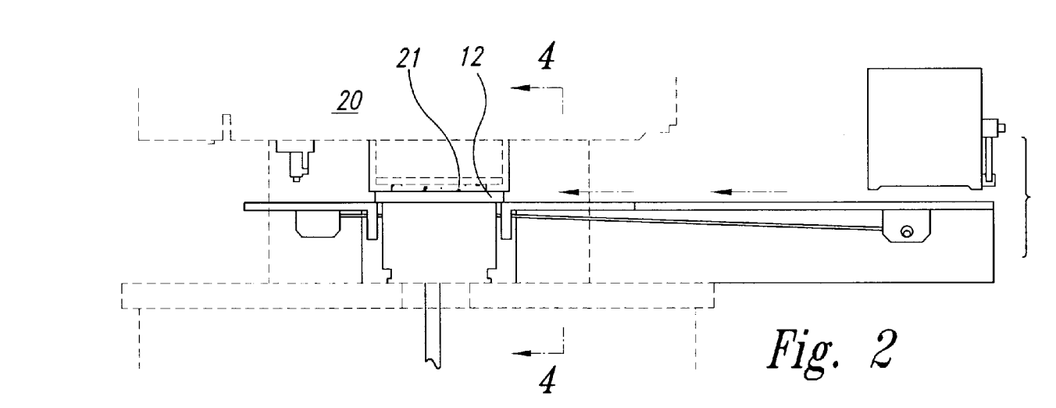
FIG. 2 illustrates a side view of the embodiment of FIG. 1, with a platen in an alternative position.
Figure 4:
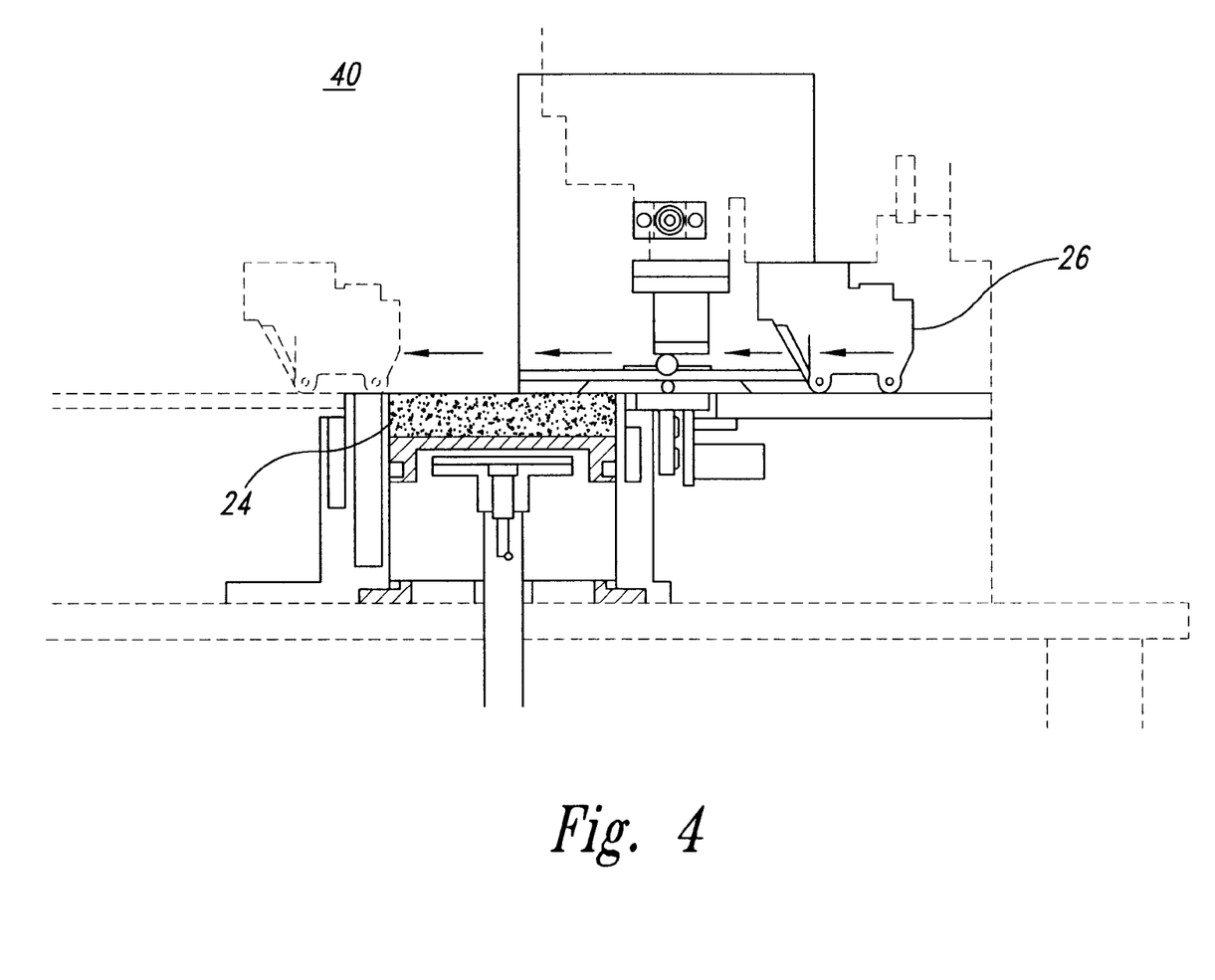
FIG. 4 shows a side view of the embodiment of FIG. 1, taken at right angle to the view of FIG. 1.

In practicing the invention the platen carrying powder is conveyed horizontally along a conveying means from the first position below the hopper to a second position such that the powder on the platen is adjacent to a build bed of a SFF or 3DP fabrication apparatus. FIG. 1 shows such a platen in a first platen position, and FIG. 2 shows such a platen in a second platen position. As shown in FIG. 4, the powder is then distributed from the platen in the second platen position to the build bed 24. The distribution is by means of a spreader 26 where the spreader could be a doctor blade or could be a roller as shown in FIG. 4. The selection of a straight or curved doctor blade, or a roller for distribution of the powder would be made according to the preferences of one skilled in the art of SFF and 3DP. In a preferred embodiment of the invention, a roller is used to distribute a powder from a platen across the build bed. The distribution or spreading of this powder across the build bed provides a new layer of powder for the solid free form fabrication or three dimensional printing process. If a roller is selected for use in distributing a powder, one skilled in the art will readily be able to determine a type of roller to use. The direction of rotation of the roller used could be in the direction of motion of the roller, or counter to the direction of motion. The roller could be vibrated while distributing the powder to compress the powder in the build bed. Optionally, a second roller in addition to the one used for distributing the powder across the build bed could be used to compress the powder in the build bed.

Return of the platen to its original position, and return of the spreader or means for distributing the powder to its original position, allows the method of dispensing and distributing to be repeated as many times as one skilled in the art chooses for a given SFF and 3DP fabrication.

Figure 7:
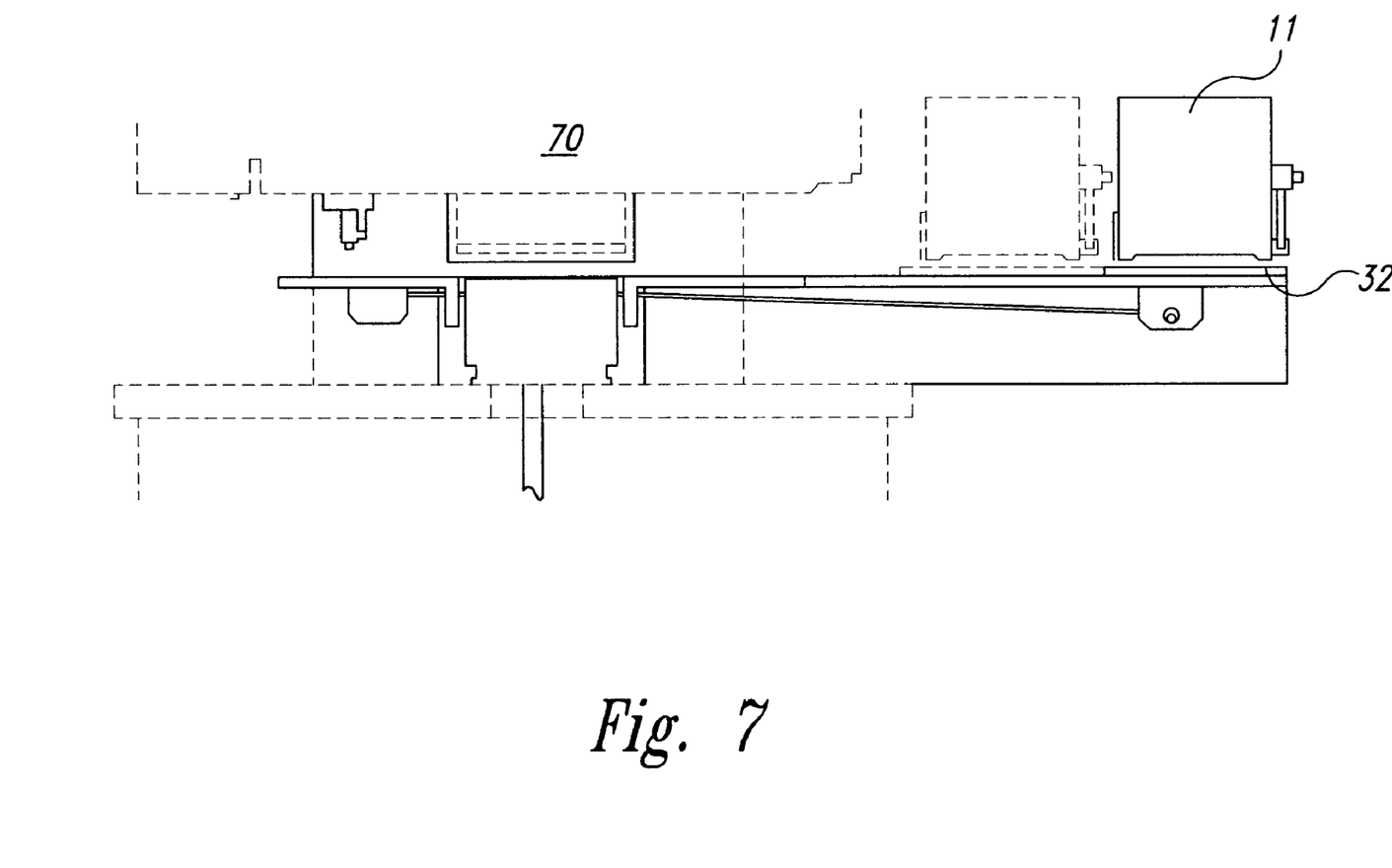
FIG. 7 shows a side view of an alternative embodiment of the invention, the alternative embodiment having two hoppers.

This method lends itself well to operation with a plurality of powders as well as with a single powder. A plurality of hoppers, as shown in FIG. 7, can be arranged in a line extending tangentially to a build bed. An elongate platen 32 is used with the length of the platen at least equal to the length of the line of hoppers. One skilled in the art can readily appreciate that a powder can be selected from a selected hopper, dispensed onto the platen below the line of hoppers, the platen moved to a selected position chosen such that the powder on the platen is adjacent to the build bed, the powder distributed from the platen across the build bed, and the platen and a means used for distributing the powder returned to their original positions. The repetition of the steps of this method as many times as chosen by one skilled in the art will allow multiple powders to be used in a build bed. Since a selected powder will only contact a given portion of the elongate platen used, cross-contamination of powders when a plurality of powders is used is therefore minimized. Alternatively, if cross-contamination is not a problem, the same platen can be positioned under the desired hopper.

The number of parts needed to dispense and distribute powders is kept to a minimum in the method of the invention. Only one sliding platen is required for operation, regardless of the number of hoppers.

Powder dispensing can be manually controlled or fully automated. This method ensures that there is minimal cross-contamination of powder since each powder is contained in individual hoppers and the hoppers dispense their powder to a unique platen location, which does not overlap any other powder's location. One of the advantages to this method is that only one sliding platen is required for operation, regardless of the number of hoppers. The close proximity of the hoppers to the platen and their location away from the surface on which the powder is to be spread, eliminates or minimizes problems associated with "dusting" of fine powders. The powder hoppers are intended to be removable assemblies, which enable a modular approach and minimizes changeover times from one powder system to the another. The powder hoppers could be along a line to one side of the SFF or 3DP apparatus used, or be arranged along a line on both sides of said apparatus and still be used in accordance with the teachings of the invention.

The apparatus of the invention can be made from a stainless steel, aluminum or other materials. It has been discovered that when the apparatus is made of aluminum, it is advantageous for the surface of powder contacting components of the apparatus to be treated by anodizing or hardcoat anodizing. It has been discovered that when the apparatus is made of aluminum, it is also advantageous for the surface of powder contacting components of the apparatus to be coated with a coating selected from the group consisting of: metal laminates consisting of metals other than nickel, an anodized finish, a hardcoat anodized finish, siloxane, baked enamel, electroplated enamel, electroless nickel, coated elastomer, laminated elastomer, dipped latex, sprayed latex (by latex is meant styrene-butadiene, polyvinyl acetate, or acrylic resins), polyvinyl chloride, nylon, polytetrafluoroethylene, polyurethane, an epoxy resin, or a polyester.

It is preferred that a powder contacting surface of an aluminum component be hardcoat anodized and subsequently coated with polytetrafluoroethylene. The hardcoat anodization may be accomplished by methods known to those in the art. Such a coating may be achieved by exposure of a surface to be treated with sulfuric acid at about 40 degrees Fahrenheit for about 60 minutes.

EXAMPLE 1

An example of a preferred aluminum powder contacting surface according to the present invention is a) treating the surface of an aluminum component with a hardcoat anodizing treatment, such as specified in military specification MIL A-8625E, Type III (this specification is hereby incorporated by reference herein); and subsequently contacting the hardcoat anodized surface with sintered polytetrafluoroethylene at from about 650 to about 700 degrees Fahrenheit, for a period of time sufficient to seal the surface of the component. This has been found to take approximately 3 hours. The sintered polytetrafluoroethylene treatment may be applied under military specification MIL-A-63576A (AR), Type I (this specification is hereby incorporated by reference herein). The resulting component exhibited surface hardness sufficient to provide a long working life in the apparatus according to the teachings of the invention, the component exhibited inertness toward corrosive powders, and the component presents a high degree of lubricity toward powders such as those used in SFF and 3DP processes using pharmaceutical ingredients. A durable coating was provided over the soft base metal, aluminum. The coated surface withstands handling, abrasion and abuse. Hardness values of up to Rc 65 may be achieved. The resulting surface was found to be highly corrosion resistant when exposed to pharmaceutical powders which would otherwise corrode aluminum. Superior dielectric properties were found. The resulting property improvements just mentioned may be due to the hardcoat anodization treatment. Additional advantages were realized due to the sintered polytetrafluoroethylene treatment. These advantages include low porosity of the surface, for reduced penetration of a powder being used against the contacting surface. That is, hard anodization may introduce increased porosity into an aluminum surface, and the sintered polytetrafluoroethylene treatment was found to seal resulting pores. Wear resistance was reduced for the treated surface of the apparatus. A very low coefficient of friction was achieved for the surface. The treated surface was made easier to clean, facilitating easier change over from one powder to another. The resulting treated surface is resistant to most alkaline and acid solutions that would be used in a pharmaceutical process using SFF or 3DP.

The advantages cited above were observed over a test surface of uncoated aluminum, with exposure to a pseudoephedrine binder solution used for 3DP.

EXAMPLE 2

Another example of a surface treatment for use according to the invention is the application of an electroless nickel with co-deposited polytetrafluoroethylene on an aluminum surface. When compared with a control surface of uncoated aluminum, with exposure to the a pseudoephedrine binder solution used for 3DP as a test challenge, the treated surface was found to be susceptible to corrosion to a degree similar to the control surface.

Although exemplary embodiments of this invention have been described in detail above, those of ordinary skill in the art will readily appreciate that many modifications are possible in the exemplary embodiments without materially departing from the novel teachings and advantages of this invention. The present invention should not be construed as being limited in any way by the specific embodiments provided herein, which invention is limited solely by the claims that follow.

We claim:

1. An apparatus for dispensing and distributing powder, comprising:

a hopper for containing a powder to be dispensed;

a rotary dispenser for measuring and dispensing a volume of the powder onto a platen, said rotary dispenser being mounted horizontally at the bottom of said hopper;

the platen for carrying the powder, said platen disposed horizontally below said hopper and mounted for linear motion along a first axis from a first platen position below and adjacent to said hopper, to a second platen position adjacent to a build bed;

means for distributing the powder from said platen in the second platen position, over said build bed, said distribution means mounted for linear motion along a second axis generally orthogonal to the first axis;

wherein at least a portion of one of the hopper, the rotary dispenser, the platen and the means for distributing the powder is coated with a coating selected from the group consisting of: anodized finish, hardcoat anodized finish, siloxane, baked enamel, electroplated enamel, electroless nickel, coated elastomer, laminated elastomer, dipped latex, sprayed latex, polyvinyl chloride, nylon, polytetrafluoroethylene, polyurethane, an epoxy resin, or a polyester.

2. The apparatus according to claim 1 wherein the interior of the hopper is coated with a coating selected from the group consisting of: anodized finish, hardcoat anodized finish, siloxane, baked enamel, electroplated enamel, electroless nickel, coated elastomer, laminated elastomer, dipped latex, sprayed latex, polyvinyl chloride, nylon, polytetrafluoroethylene, polyurethane, an epoxy resin, or a polyester.

3. The apparatus according to claim 2 wherein the coating is a hardcoat anodized finish.

4. The apparatus according to claim 3 wherein the coating further comprises polytetrafluoroethylene.

5. The apparatus according to claim 1 wherein the rotary dispenser is coated with a coating selected from the group consisting of: anodized finish, hardcoat anodized finish, siloxane, baked enamel, electroplated enamel, electroless nickel, coated elastomer, laminated elastomer, dipped latex, sprayed latex, polyvinyl chloride, nylon, polytetrafluoroethylene, polyurethane, an epoxy resin, or a polyester.

6. The apparatus according to claim 5 wherein the coating is a hardcoat anodized finish.

7. The apparatus according to claim 6 wherein the coating further comprises polytetrafluoroethylene.

8. The apparatus according to claim 1 wherein the platen is coated with a coating selected from the group consisting of: anodized finish, hardcoat anodized finish, siloxane, baked enamel, electroplated enamel, electroless nickel, coated elastomer, laminated elastomer, dipped latex, sprayed latex, polyvinyl chloride, nylon, polytetrafluoroethylene, polyurethane, an epoxy resin, or a polyester.

9. The apparatus according to claim 8 wherein the coating is a hardcoat anodized finish.

10. The apparatus according to claim 9 wherein the coating further comprises polytetrafluoroethylene.

11. The apparatus according to claim 1 wherein the means for distributing the powder is coated with a coating selected from the group consisting of: anodized finish, hardcoat anodized finish, siloxane, baked enamel, electroplated enamel, electroless nickel, coated elastomer, laminated elastomer, dipped latex, sprayed latex, polyvinyl chloride, nylon, polytetrafluoroethylene, polyurethane, an epoxy resin, or a polyester.

12. The apparatus according to claim 11 wherein the coating is a hardcoat anodized finish.

13. The apparatus according to claim 12 wherein the coating further comprises polytetrafluoroethylene.

14. An apparatus for dispensing and distributing powder, comprising:

a hopper for containing a powder to be dispensed;

a rotary dispenser for measuring and dispensing a volume of the powder onto a platen, said rotary dispenser being mounted horizontally at the bottom of said hopper;

the platen for carrying the powder, said platen disposed horizontally below said hopper and mounted for linear motion along a first axis from a first platen position below and adjacent to said hopper, to a second platen position adjacent to a build bed;

means for distributing the powder from said platen in the second platen position, over said build bed, said distribution means mounted for linear motion along a second axis generally orthogonal to the first axis;

a cylindrical sleeve having a long axis and two opposed side openings parallel to the long axis, having a first opposed side open to an interior of said hopper and having a second opposed side open to an exterior of said hopper; said rotary dispenser further comprising:

a cylinder sized and shaped to be closely received within said cylindrical sleeve and rotatably mounted within said cylindrical sleeve, said cylinder further having an elongate recess disposed along a surface of said cylinder, for receiving the powder when the recess is adjacent to the first opposed side opening, and for dispensing the powder when the recess is adjacent to the second opposed side opening; and wherein the recess is coated with a coating selected from the group consisting of: anodized finish, hardcoat anodized finish, siloxane, baked enamel, electroplated enamel, electroless nickel, coated elastomer, laminated elastomer, dipped latex, sprayed latex, polyvinyl chloride, nylon, polytetrafluoroethylene, polyurethane, an epoxy resin, or a polyester.

* * * * *